United States Patent Office 3,344,922
Patented Oct. 3, 1967

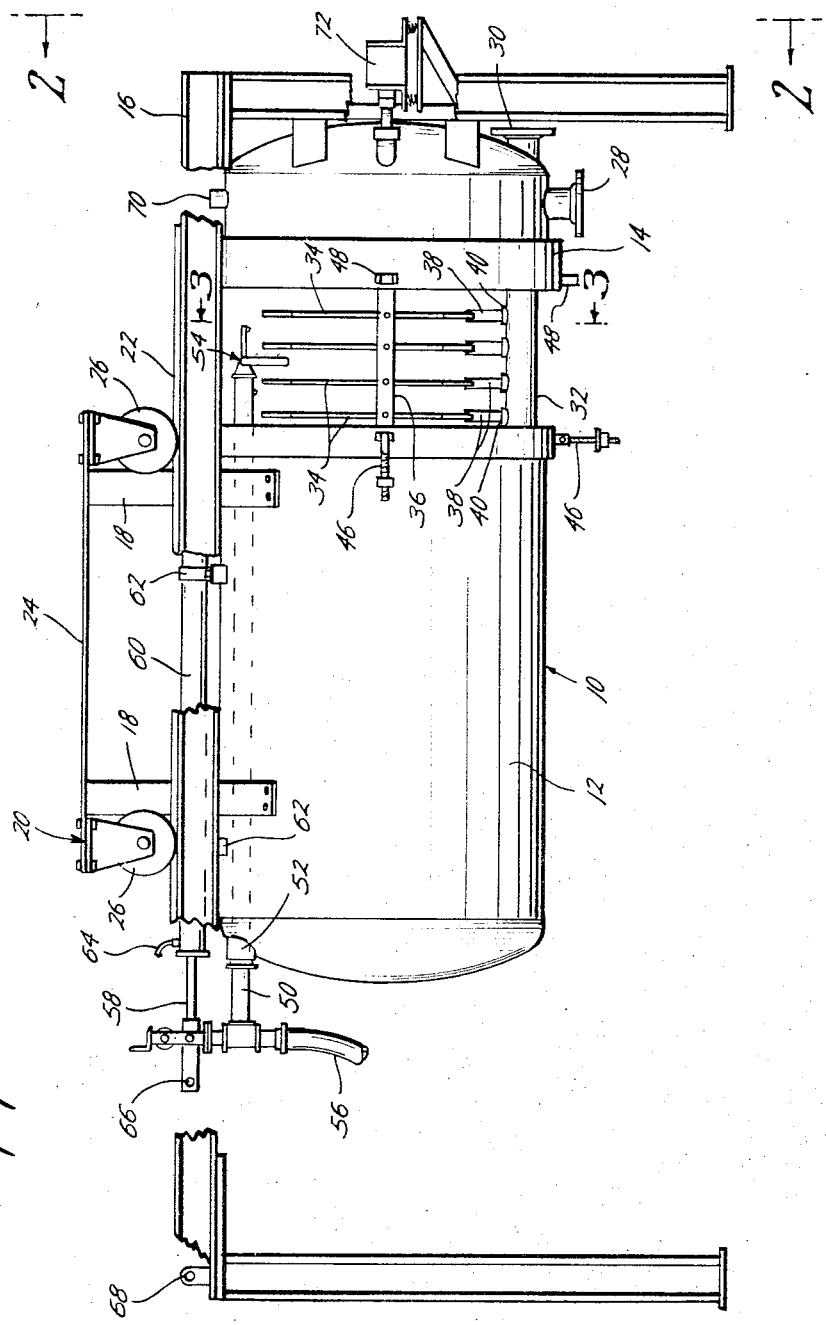

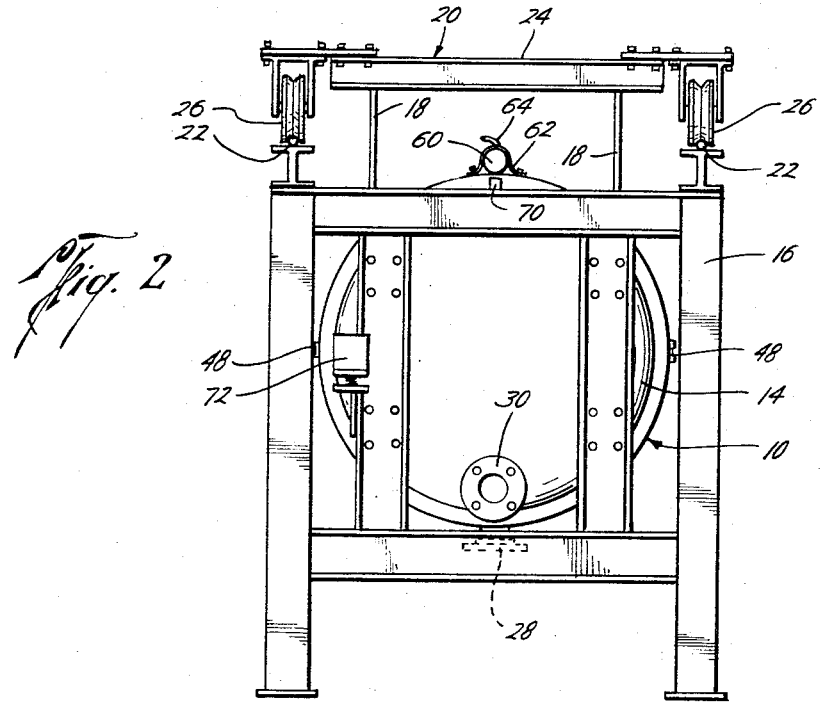
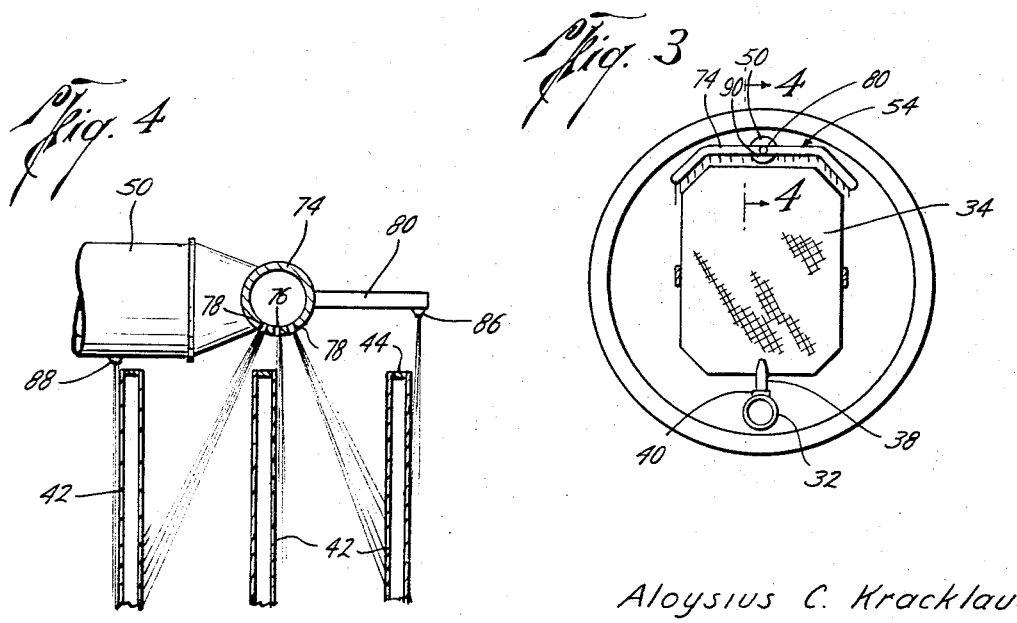

3,344,922
APPARATUS FOR USE IN FILTERING FLUIDS
Aloysius Kracklauer, Conroe, Tex., assignor to Sparkler Mfg. Company, Montgomery, Tex., a corporation of Illinois
Filed May 11, 1964, Ser. No. 366,229
10 Claims. (Cl. 210—81)

ABSTRACT OF THE DISCLOSURE

A pressure tight filter vessel containing a plurality of filter plates in parallel relationship, the vessel including a tank and a cover, one of which is movable with respect to the other. A conduit generally perpendicular to the parallel relationship of filter plates, the conduit reciprocally movable inside the filter vessel with respect to the movable one of tank and cover. A spray header on the conduit, the spray header having a leading cake-cutting spray which cuts the filter cake on each filter leaf along a central plane thereof, and a washing spray effective to wash the complete filter plate, following the cake-cutting spray.

---

The invention concerns apparatus which may be employed in the filtering of fluids to remove suspended matter therefrom, and also includes a method and device suitable for cleaning filter plates contained in such apparatus.

Industrial filtering apparatus commonly comprise a vessel having a plurality of filter plates therein which filter the fluid as it passes through a filtering means associated with each plate, and inlet and outlet means for introducing the fluid to the plates and removing the fluid from the vessel after it passes through the filtering means. One common construction which has wide applicability employs a plurality of spaced filter plates, each comprising two spaced parallel filtering means, a connecting member between the spaced filtering means near their periphery to close the plate and prevent fluid flow to the interior of the plate in a path other than through a filtering means, and an outlet communicating with the interior of the plate to permit fluid in the interior of the plate, which has been filtered by the filtering means, to flow from the plate into a manifold or the like. The filtered fluid or filtrate can then pass out of the manifold and thus out of the filtering apparatus without mixing with the incoming unfiltered fluid. The filtering means associated with each plate can comprise, for example, metal screen, woven cloth, a bed of granular material, any number or combination of these, or any other means for filtering suspended matter from a fluid.

During the filtering operation, the suspended matter removed from the fluid by the filtering means usually collects thereon as a cake, and this cake must be removed from the filtering means periodicaly to insure good operation. The removal can be effected by back flushing, vibration, direct washing with a fluid, or the like, but the usual procedure with respect to apparatus containing spaced filter plates as described above involves washing or blowing the cake off the plates with water or other fluids or compressed air or gas, frequently in conjunction with vibrating the plates. The washing or blowing can be accomplished by emptying the vessel of fluid to be filtered and then passing over the plates a spray of sufficient force to wash or blow the cake from the plates. The matter constituting the cake will then fall to the bottom of the vessel, where it can be removed from the vessel by washing out through a drain or by other suitable procedures.

The invention provides novel apparatus which may be employed in the filtering of fluids, but which also may be employed for any use consistent with the design. An apparatus in accordance with the invention is amenable to convenient operation even when made large and consequently heavy to meet the requirements of a particular industrial use. The invention also provides a method and a device which may be employed with the above apparatus to improve the operation of cleaning the filter plates after a cake collects thereon during filtering.

Generally, the invention may be a vessel comprising a tank and a cover disposed to permit reciprocal movement of one relative to the other to open and close the vessel, but adapted to fit together securely; a conduit means reciprocally movable within the vessel; and means associated with the vessel and the conduit means both for reciprocally moving the conduit means relative to the vessel and for reciprocally moving either the tank or the cover relative to the other to open and close the vessel.

Another aspect of the invention includes a spray header for use in removing collected cakes from filter plates disposed in a filtering apparatus in substantially parallel relationship. The spray header is adapted to be reciprocally movable over a set of ends of the plates in a direction substantially perpendicular to the parallel relationship of the plates, and it has a plurality of washing spray apertures disposed in a direction parallel to the parallel relationship and a cake-cutting spray nozzle disposed in a leading relationship with respect to the washing spray apertures for cutting the cakes into halves prior to washing the faces of the plates. Thus, in operation, spray from the cake-cutting spray nozzle cuts the cakes in halves prior to a full washing or blowing of the faces through the washing spray apertures, and it has been found that improved operation results.

The invention will be better understood by reference to the drawings wherein:

FIG. 1 is a side elevational view illustrating an embodiment of an apparatus in accordance with the invention with parts broken away to illustrate otherwise hidden features;

FIG. 2 is an end elevational view taken along the line 2—2 in FIG. 1;

FIG. 3 is a sectional view taken along the line 3—3 in FIG. 1; and

FIG. 4 is a fragmentary enlarged sectional view taken along the line 4—4 in FIG. 3 and illustrates an embodiment of a spray header in accordance with the invention.

With reference to FIGS. 1 and 2, an embodiment of the invention is shown for use in filtering suspended material from a liquid. As illustrated, vessel 10 comprises a tank 12 and a cover 14 both of which are mounted on support structure 16. To permit reciprocal movement between the tank 12 and the cover 14 and thereby to permit opening and closing of vessel 10, cover 14 is fixedly mounted to support structure 16 and tank 12 is movably mounted thereon. Movable mounting of tank 12 may be accomplished by suspending tank 12 to a trolley 20 by means of straps 18. Trolley 20 is of course adapted to move along track 22 on the top of the support structure 16 so that tank 12 may be reciprocally moved relative to cover 14. The trolley 20 conveniently takes the form of a supporting body section 24 which carries wheels 26. Of course, a variety of means may be employed for movably mounting the tank 12 on the support structure 16.

Cover 14 has an inlet 28 for permitting entrance of a fluid to be filtered into the interior of the vessel 10 and an outlet 30 which is located at the end of manifold 32 which runs along the bottom of the vessel 10 and is fixedly connected to the cover 14. A plurality of filter plates 34 rests in a rack 36, which is carried by cover 14. Plates 34 communicate with the manifold 32 in a manner which permits fluid in the interior of the filter plates 34 to pass into the manifold 32 and be discharged through outlet 30. As better shown in FIG. 3, each of the filter plates 34 has a nozzle 38 which communicates with its interior and which is mateably received by receptacle 40 on the manifold 32. Of course, the filter plates 34 may be constructed in any manner suitable for the filtering operation and may be located in the vessel 10 and connected to the manifold 32 by any suitable means. The filter plates 34 each comprises preferably, as better shown in FIG. 4, two parallel metal filtering screens 42 and a member 44 near the periphery of the screens 42 connecting the parallel screens 42 and preventing fluid flow from outside the screens 42 to their interior in a manner other than through the screens 42.

Referring again to FIGS. 1 and 2, the tank 12 is adapted to fit securely against the cover 14 for forming a completely closed vessel 10. The tank 12 and cover 14 may be secured together by any suitable means such as the swing bolts 46 and lugs 48 illustrated. Thus, with the vessel 10 closed, a fluid to be filtered introduced into the vessel 10 through the inlet 28 will flow up around the filter plates 34, into the interior of the filter plates 34 through the filtering screens 42, out of the interior of the filter plates 34 through the pipes 38, and into the manifold 32 where the filtrate can flow from the system through the outlet 30 mounted on the cover 14. Particulate materials removed from the fluid will, of course, be deposited on the filter screens 42.

Means are provided for removing the cake of particulate material which may accumulate on screen 42, and these means may conveniently take the form of a conduit 50, which is slidably carried through a packing gland 52 in the wall of the tank 12 and which carries a spray header 54 on the end thereof inside the vessel 10. Thus, when a fluid such as water is introduced into the conduit 50 through a hose 56, spray from the spray header 54 will wash away cakes collected on the plates 34. The cake, after removal, falls into the bottom of the vessel 10 from which it may be removed through opening of the vessel 10 or by draining out through inlet 28.

The conduit 50 is connected with a hydraulic ram 58 which fits in a cylinder 60 mounted on the tank 12 by suitable brackets 62. The cylinder 60 is adapted to admit hydraulic fluid at either of its ends through inlets 64 and thereby drive the ram 58 in either direction. Thus, by actuating hydraulic ram 58, the conduit 50 and consequently the spray header 54 will move relatively to the tank 12, the spray header 54 will pass over the ends of the filter plates 34 to remove cake from the surfaces of the filter plates 34.

To open the vessel 10, the hydraulic ram 58 is extended out from the tank 12 to a point where a hole 66 associated with the hydraulic ram 58 will center with a hole 68 in support structure 16. A pin (not shown) is inserted through registering holes 66 and 68 to keep the hydraulic ram 58 and the conduit 50 in immovable relationship with the support structure 16. When the tank 12 and cover 14 are disengaged by unlatching bolts 46 and lugs 48 and the hydraulic ram 58 is actuated to move back into the cylinder 60, the tank 12 will be drawn from the cover 14 to open the vessel 10. Conversely, by securing the ram 58 to the support structure 16 when the vessel 10 is open, the vessel 10 can be closed by actuation of the hydraulic ram 58.

A vent 70 is preferably included in the vessel 10 to prevent fluid locks in the vessel 10, and a device 72 for vibrating the filter plates 34 to help remove cakes therefrom is preferably associated with the filter plates 34 by way of the rack 36 and the cover 14.

As particularly illustrated in FIG. 3, the spray header 54 preferably comprises a conduit 74 extending in a direction substantially parallel to the faces of the filter plates 34 and of a length sufficient to permit washing of substantially the entire faces of the filter plates 34. As better shown in FIG. 4, the conduit 74 is provided with an aperture 76 directed substantially parallel with the faces of the plate 34 and apertures 78 disposed on either side of the aperture 76 and directed at an angle from the vertical to permit thorough washing of plates 34. Of course, a plurality of apertures 76 and 78 are provided along the length of the conduit 74 to permit washing of the entire faces of the filter plates 34 as explained before. A second conduit 80 extends from the first conduit 74 in a direction perpendicular to the longitudinal axis of the first conduit 74 and contains a cake-cutting nozzle 86 for cutting the cakes on the plates 34 substantially in halves before the washing spray from the apertures 76 and 78 wash the plates 34. Although this spray header construction is not necessary in the operation of a filtering apparatus, it has been found to be much more effective than existing designs. It is also preferable to include another cake-cutting nozzle 88 on the other side of the conduit 74 to permit a cutting action in either direction from the conduit 74 in case the conduit 50 is moved in one direction before the other. As shown in FIG. 4, the cutting nozzle 88 may be located in the conduit 50, but it also may be disposed in a conduit similar to the conduit 80, or in any other suitable manner.

By passing a cake-cutting spray over the cake to cut the cake along a central line and then following this spray with a washing spray over substantially the full faces of the plate, an improved washing action is accomplished. Larger pieces of cake removed from plates 34 by use of the cutting and spray means described do not tend to collect on the manifold 32 as much as do cakes that were not cut before being washed off the plates 34. In this regard, the conduit 74 preferably comprises, near its central portion and the center line of the plates 34 divergent spray holes 90 shown in FIG. 3 to help force the split cakes away from the manifold 32 as the cakes wash from the filter plates 34. Central spray holes each directed divergently about 10 degrees from the central line of the cakes have been found to be satisfactory.

The embodiment of the invention described specifically above permits easy and convenient operation of filtering equipment. Further more, because of the invention only relatively simple and inexpensive parts are required to provide convenient operation.

Although the construction specifically described above is preferred, it may be modified without departing from the scope of the invention. For example, holes 66 and 68 and the pin adapted to fit through the holes when centered may be any releasable securing means, such as a latch mechanism. The hydraulic ram 58 and the cylinder 60, which provide a motive means in the described apparatus, may be located on the cover 14 or the supporting structure 16 and perform the same function if a releasable securing means is disposed between the conduit 50 or the ram 58 and the tank 12. It will also be manifest that the cover 14 can be reciprocally movable with respect to the structure 16 and the tank 12 fixedly mounted on the structure 16 to accomplish the same purpose by rearranging the parts and the location of these parts. Furthermore, it will be apparent that other motive means beside the hydraulic ram 58 and cylinder 60 may be employed, such as a rack and pinion arrangement and the like. In this regard, the housing or base of the motive means would correspond to the cylinder 60 and be attached in the same location.

It will also be apparent that limiting switches can be advantageously employed to control the motive means and consequently limit the movement of the conduit and the tank.

While specific terms have been used to describe one embodiment of the invention for illustrative purposes they are not intended nor should they be construed to limit the invention as defined by the following claims.

What is claimed is:

1. An apparatus suitable for containing filter plates for filtering a fluid passing therethrough, said apparatus comprising:

a support structure;

a vessel comprising a tank and a cover adapted to fit together securely, one of said tank and said cover being fixedly mounted on said support structure and the other being reciprocally movable relatively thereto to open and close said vessel;

a conduit means extending slidably through a wall or said vessel; and hydraulically actuated motive means including a housing fixedly attached to the reciprocally movable one of said tank and said cover, said motive means being associated with said conduit means for movement of the conduit means relative to said reciprocally movable one of said tank and said cover; and said motive means including releasable securing means for holding said conduit means immovable relatively to said support structure, so that upon securing said conduit means and actuating said motive means, said movable one of said tank and said cover is moved relatively to the other.

2. The apparatus defined in claim 1 wherein said reciprocally movable one of said tank and said cover is said tank.

3. The apparatus defined in claim 1 wherein said securing means comprises a first hole associated with said support structure, a second hole associated with said conduit means and axially disposable with said first hole, and a pin adapted to fit therethrough.

4. A filtering apparatus containing filter plates and being constructed to permit easy cleaning and maintenance of said filter plates; said apparatus comprising:

a support structure;

a vessel for containing said filter plates, said vessel comprising a cover fixedly mounted on said support structure and a tank movably mounted on said support structure to permit relative reciprocal movement between said tank and said cover to permit opening and closing said vessel;

a conduit means extending slidably through said tank and having a spray header thereon, so that said spray header can be reciprocally moved relatively to said plates to permit cleaning thereof with a fluid introduced in said conduit means;

hydraulically actuated motive means including a housing fixedly attached to said tank and a ram fixedly attached to said conduit means, for reciprocal movement of said conduit means relative to said tank;

said motive means including a releasable securing means for holding said conduit means immovable relatively to said support structure, so that upon securing said conduit means and actuating said motive means, said tank moves relative to said cover, thereby permitting opening and closing said vessel.

5. The apparatus defined in claim 4 wherein said securing means comprises a first hole associated with said support structure, a second hole associated with said conduit means and axially disposable with said first hole, and a pin adapted to fit therethrough.

6. In a filtering apparatus containing filter plates disposed in substantially parallel relationship which collect cakes thereon during the filtering operation, a spray header reciprocally movable in relation to said plates over a set of ends thereof in a direction perpendicular to the parallel relationship and adapted to remove collected cake from said plates; said header comprising:

a first conduit extending in a direction substantially parallel to said parallel relationship and having a plurality of apertures therein spaced in the same parallel direction, said conduit extending for a length sufficient to permit fluid from said apertures to wash over the faces of said plates; and a second conduit extending from said first conduit in a direction perpendicular to the longitudinal axis of said first conduit and having a cake-cutting nozzle disposed to permit cutting of said cakes substantially into halves, said cake-cutting nozzle being disposed to lead said apertures during operation of said spray header.

7. In a filtering apparatus containing filter plates disposed substantially vertical and in substantially parallel relationship, said plates having faces which collect cakes thereon during the filtering operation, a spray header reciprocally movable in relation to said plates over a set of ends along a central longitudinal axis thereof in a direction substantially perpendicular to the parallel relationship and adapted to remove collected cake from said plates, said header having a plurality of washing spray apertures disposed on both sides of said longitudinal axis along a line generally perpendicular to said axis and parallel to the parallel relationship, and having a cake-cutting nozzle disposed in a leading relationship with respect to said washing spray apertures and displaced from said washing spray apertures in a direction along said central longitudinal axis for cutting said cakes into halves prior to washing the faces of said plates.

8. The spray header defined in claim 7, wherein said spray header has two cake-cutting nozzles disposed to provide a leading relationship in either direction along the reciprocal movement of said spray header.

9. The spray header defined in claim 7 wherein at least two of the apertures are disposed to spray divergently in order to help remove said cakes from said plates after said cakes are cut in halves during operation by the action of said cake-cutting nozzle.

10. A method for cleaning filter plates having cakes thereon and disposed in a parallel relationship in a filtering apparatus, which method comprises passing a cake-cutting spray from a first nozzle over said cakes to cut said cakes only along substantially a central plane perpendicular to said parallel relationship, and following said cake-cutting spray with a washing spray from a plurality of other nozzles over substantially the full faces of said plates.

References Cited

UNITED STATES PATENTS

| | | | |
|---|---|---|---|
| 2,609,101 | 9/1952 | Howland et al. | 210—409 X |
| 2,765,083 | 10/1956 | Purmort | 210—236 |
| 2,868,379 | 1/1959 | Hunziker | 210—391 X |
| 2,878,942 | 3/1959 | Whitmore | 210—236 X |
| 2,936,093 | 5/1960 | Passalaqua. | |
| 2,975,903 | 3/1961 | Ulrich | 210—236 |
| 3,157,598 | 11/1964 | Rebiscoul | 210—391 X |
| 3,285,417 | 11/1966 | Schmidt et al. | 210—409 X |

REUBEN FRIEDMAN, *Primary Examiner.*

C. D. DITLOW, *Assistant Examiner.*